United States Patent
Nagayama et al.

[15] 3,658,671
[45] Apr. 25, 1972

[54] SULFOXIDATION OF PARAFFIN

[72] Inventors: Masuzo Nagayama, Tokyo; Terunosuke Kawana, Funabashi-shi, both of Japan

[73] Assignee: Lion Fat & Oil Co., Ltd., Tokyo, Japan

[22] Filed: Sept. 18, 1969

[21] Appl. No.: 859,118

[30] Foreign Application Priority Data

Sept. 20, 1968 Japan......................................43/67547
Sept. 21, 1968 Japan......................................43/68675

[52] U.S. Cl. ..........................................................204/162 SA
[51] Int. Cl. ...............................................................B01j 1/10
[58] Field of Search ..................................................204/162 R

[56] References Cited

UNITED STATES PATENTS

| | | | |
|---|---|---|---|
| 3,457,155 | 7/1969 | Rosinger et al. | 204/162 S |
| 2,702,273 | 2/1955 | Kennedy et al. | 204/162 |
| 3,372,188 | 3/1968 | Alston et al. | 204/162 X |

*Primary Examiner*—Benjamin R. Padgett
*Attorney*—Woodhams, Blanchard & Flynn

[57] ABSTRACT

A method of sulfoxidation of paraffin which comprises the steps of imparting actinic ray energy, to paraffin which contains not more than 5 weight percent of the reaction product of sulfoxidation and/or oxygen, and which contains sulfur dioxide gas dissolved therein, and subsequently blowing oxygen and sulfur dioxide gas into the thus processed paraffin.

11 Claims, 3 Drawing Figures

Patented April 25, 1972 3,658,671

INVENTORS
MASUZO NAGAYAMA
TERUNOSUKE KAWANA
BY
Woodhams, Blanchard & Flynn
ATTORNEYS

SULFOXIDATION OF PARAFFIN

BACKGROUND OF THE INVENTION a. Field of the Invention

The present invention relates to an improved method of sulfoxidizing paraffin by a photo-chemical reaction, which serves to enhance the space time yield of the sulfoxidizing reaction through effective utilization of actinic ray energy.

b. Description of the Prior Art

The sulfoxidation of paraffins using sulfur dioxide and oxygen by a photo-chemical reaction can be expressed by the reaction formula

$$RH + SO_2 + \tfrac{1}{2}O_2 \longrightarrow RSO_2OH$$

and said photo-chemical reaction progresses as follows:

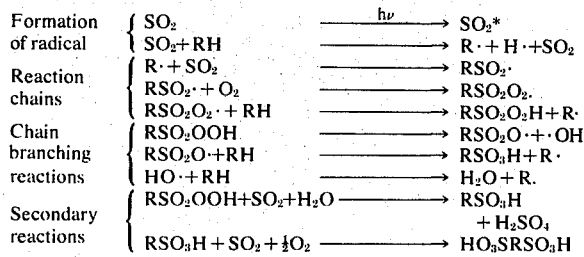

Formation of radical:
$SO_2 \xrightarrow{h\nu} SO_2{}^*$
$SO_2{}^* + RH \longrightarrow R\cdot + H\cdot + SO_2$ Reaction chains:
$R\cdot + SO_2 \longrightarrow RSO_2\cdot$
$RSO_2\cdot + O_2 \longrightarrow RSO_2O_2\cdot$
$RSO_2O_2\cdot + RH \longrightarrow RSO_2O_2H + R\cdot$ Chain branching reactions:
$RSO_2OOH \longrightarrow RSO_2O\cdot + \cdot OH$
$RSO_2O\cdot + RH \longrightarrow RSO_3H + R\cdot$
$HO\cdot + RH \longrightarrow H_2O + R\cdot$ Secondary reactions:
$RSO_2OOH + SO_2 + H_2O \longrightarrow RSO_3H + H_2SO_4$
$RSO_3H + SO_2 + \tfrac{1}{2}O_2 \longrightarrow HO_3SRSO_3H$ Remark: $SO_2{}^*$ in the above means sulfur dioxide gas excited by light irradiation.

According to the prior art, such paraffin sulfoxidation reaction as expressed by the foregoing photo-chemical reaction formula has generally been effected continuously by placing paraffin in a reactor and irradiating ultraviolet rays or the like thereon. For the purpose of preventing coloring substances from adhering onto the irradiation lamp or its jacket for ultraviolet rays and the like or controlling formation of any secondary reaction product such as disulfonate, an adequate quantity of water is added to the reaction system. And, it has been conventional that the resultant reacted mixture is discharged from the reactor and the heavy-layer containing the reaction product is separated from the said mixture, while unreacted paraffin is recycled to the reactor.

It is to be noted, however, that the sulfoxidizing reaction initiated by light irradiation does not require energy during the course of the reactions except for the step of forming radical as may be inferred from the foregoing photo-chemical reaction formula. In other words, in a sulfoxidizing reaction of this kind, actinic ray energy is required only in the early stage of the reaction steps and is not required in other steps. Therefore, it is rather uneconomical, from the viewpoint of effective utilization of actinic ray energy, to apply light irradiation at any stage other than during the early stage of the reaction. When analyzed in due consideration of the above, the foregoing conventional method of sulfoxidation has such a drawback that, because as it permits the existence of reaction products within the zone of light irradiation, the irradiation energy of light is wasted on said reaction products and the amount of such consumption is further increased as the amount of the reaction products increases with the progress of the reaction. Such being the case, the conventional method of sulfoxidation has not necessarily been an advisable one.

Besides, the sulfoxidation of paraffin requires the existence of sulfur dioxide gas and oxygen, but in the early stage of the sulfoxidizing reaction, to wit, at the stage of forming radicals as inferred by the foregoing photo-chemical reaction formula, no oxygen is required at all. To be precise, the stage of forming radicals in the sulfoxidizing reaction by means of ultraviolet ray irradiation may be divided in two stages, namely, the primary process of photo-chemical reaction and the secondary process of photo-chemical reaction, and during said two processes and subsequent process of forming the sulfonyl radical ($RSO_2\cdot$), there is no requirement for the existence of oxygen at all. Meanwhile, inasmuch as oxygen is hardly possessed of the capacity for absorbing ultraviolet rays of a wave length off more than 2,000 A., the existence of oxygen has no direct bearing on the process of forming radicals. However, because of the great reactivity of $SO_2{}^*$ excited by ultraviolet rays, oxygen acts to deactivate such activity. Therefore, the coexistence of oxygen at the stage of forming radicals at least would result in consumption of the excited $SO_2{}^*$ by said oxygen and a substantial decrease in the amount of $SO_2{}^*$ which is supposed to contribute to the foregoing secondary process of photo-chemical reaction, and this in turn reduces the space time yield of the sulfoxidation reaction.

In the light of the foregoing, when there is carried out a paraffin sulfoxidation reaction utilizing a photo-chemical reaction, there is no requirement for the existence of oxygen in the reaction system during the stage of forming radicals at least, and its existence is indeed undesirable because it causes the consumption of $SO_2{}^*$. However, in the conventional method of effecting a sulfoxidizing reaction by utilizing the energy of ultraviolet rays, no consideration has been given at all to the influence of oxygen at the stage of forming radicals as set forth above.

SUMMARY OF THE INVENTION

An object of the present invention is to facilitate the effective utilization of actinic ray energy by preventing reaction products from existing within the effective zone of light irradiation and thereby enhancing the yield of sulfoxidized substance resulting from the sulfoxidizing reaction.

Another object of the present invention is to prevent oxygen from existing within the effective zone of light irradiation to thereby prevent excited sulfur dioxide gas from being consumed by oxygen, and thereby facilitate effective utilization of the excited sulfur dioxide gas.

A further object of the present invention is to greatly enhance the space time yield of the the photo-sulfoxidizing reaction by preventing both the reaction products and oxygen from existing within the effective zone of light irradiation.

One mode of the method of photo-sulfoxidation according to the present invention is characterized by the fact that: the reaction system is divided into a light irradiation zone and a reaction zone; the paraffin existing within the foregoing light irradiation zone contains at least sulfur dioxide gas as well as less than 5 w. percent of the reaction products of sulfoxidation; said paraffin is subjected to light irradiation to generate radicals; and paraffin which has undergone the said light irradiation is then introduced into the foregoing reaction zone to thereby cause chain reactions based on said radicals in the presence of sulfur dioxide gas and oxygen coexisting within said reaction zone.

In this method, mixing of the reaction products obtained within the reaction zone into the light irradiation zone should be prevented. This prevention, however, may be easily accomplished by either effecting the reactions by means of a continuous circulation system and sending paraffin always from the light irradiation zone to the reaction zone or by separately providing the light irradiation zone and the reaction zone. Moreover, it is of course desirable to move paraffin from the light irradiation zone to the reaction zone as promptly as possible in view of the short duration of the activity of radicals to be obtained in the light irradiation zone.

According to this method, paraffin to be supplied to the light irradiation zone should contain sulfur dioxide gas, but is not necessarily required to be saturated with said gas. Besides, though it is desirable that said paraffin within the light irradiation zone contains no oxygen, this in not an indispensable condition.

Another mode of the method of photo-sulfoxidation according to the present invention is characterized by the fact that paraffin existing within the light irradiation zone is to be kept substantially free from oxygen. In other words, the method of sulfoxidizing paraffin according to the present invention comprises the steps of expelling the oxygen contained in the paraffin, making sulfur dioxide gas dissolve in said paraffin, imparting actinic ray energy to the paraffin, and blowing oxygen and sulfur dioxide gas into the paraffin subsequent to imparting actinic ray energy thereto.

In the present method, the means for expelling oxygen contained in paraffin is not limited to any particular ones. That is to say, such processes as blowing an inert gas like nitrogen gas or sulfur dioxide gas into paraffin, reduction of pressure, heating, and means combining two or more of these processes are applicable. But, in view the requirement for causing sulfurous acid gas to dissolve in the paraffin subsequent to expelling oxygen therefrom, it is most desirable that said expelling of oxygen be effected by blowing sulfur dioxide gas into paraffin. And, when expelling oxygen from paraffin, it is advisable that the blowing in of sulfur dioxide gas be effected at a comparatively low temperature or under increasing pressure in order to enhance the amount of sulfur dioxide gas dissolved in the paraffin. The appropriate amount of sulfur dioxide gas required for saturating paraffin therewith is in the range of one-tenth – 10 times as much as the amount of sulfur oxide gas to be introduced for the purpose of sulfoxidation reaction. Accordingly, when the amount of sulfur dioxide gas employed for expelling oxygen is small, blowing of oxygen into paraffin subsequent to irradiation with ultraviolet rays is to be accompanied by simultaneous blowing of sulfur dioxide gas.

One of the most desirable modes of the method of photosulfoxidation according to the present invention is a mode combining the foregoing two modes. That is, this mode is not only capable of holding the amount of the reaction products of sulfoxidation contained the paraffin at the light irradiation zone below 5 wt. percent, but also substantially prevents oxygen from existing within said zone and initiates the photo-sulfoxidizing reaction.

In the present invention, both paraffins having straight chains of $C_8 - C_{20}$ and paraffins having branched chains of the same carbon atom number are generally applicable, and, moreover, such paraffins as are obtained by further refining the foregoing paraffins with fuming sulfuric acid or sulfuric anhydride are also applicable. The actinic light to be employed for the method according to the present invention has a wave length in the range of $1 \times 10^{-3} - 4 \times 10^3$ A. In this respect, such actinic rays as $\gamma$ ray, X ray and ultraviolet ray are applicable and, above all, ultraviolet ray is capable of demonstrating the effect of the present invention most conspicuously. The existence of water within the light irradiation zone is rather desirable inasmuch as such water attaches to the lamp to thereby control the formation of coloring substances which is incidental to overheating of the material and acts to deteriorate the irradiation efficiency of the lamp.

The mixing ratio of sulfur dioxide gas and oxygen to be supplied to the reaction zone is somewhat influenced by the amount of sulfur dioxide gas and oxygen supplied to the paraffin, but it is advisable to apply the ratio of $SO_2 : O_2 = 0.5-6.0 : 1$ (in terms of volume). The temperature of the reaction zone is in the range of 15° – 35° C., and the pressure thereat ranges from normal pressure to several atmospheric pressures e.g. about 6 atmospheres.

After-treatment of the reacted mixture produced by sulfoxidation in the reaction zone, for instance, separation and recovery of unreacted paraffin, separation of desired end product, viz., paraffin sulfonic acid - removal of inorganic salt and unreacted oil (dissolved paraffin) - and recovery thereof may be effected by the well-known means as the occasion demands.

Further, the method of recovering and circulating unreacted gas as well as that of adding water can also be effected by applying well-known method as the occasion demands.

As elucidated in the foregoing, the present invention serves to prevent light irradiation onto the reaction products so that the irradiation energy of light may be exclusively consumed for effecting the reactions and, accordingly, the efficiency of utilization of said irradiation energy can be enhanced to increase the yield of reaction. Moreover, according to the method of the present invention, irradiation of ultraviolet rays can be effected under such condition that there exists substantially no oxygen and, consequently, $SO_2$ * excited by irradiation with ultraviolet rays is never deactivated by oxygen, so that substantially the whole amount of the resultant $SO_2$ * may be utilized for effecting the sulfoxidizing reaction. Not only that, inasmuch as there exists no oxygen at the time of irradiation with ultraviolet rays, staining of the irradiating surface owing to formation of coloring substances can be prevented and deterioration of its perviousness to light can also be prevented. Further, according to the prior art wherein the irradiation is to be effected in the presence of oxygen, there would occur formation of coloring substances which are apt to attach to the irradiating surface and, as a result, the existence of water has been required in order to prevent formation of such substances. According to the present invention, however, the sulfoxidizing reaction can be effected even under the condition that substantially no water is allowed to exist within the reaction zone. Moreover, according to the present invention, the light irradiation zone and the reaction zone can be provided separately, and, therefore, it is also possible to maintain the optimum condition for the respective zones individually.

BRIEF DESCRIPTION OF THE DRAWINGS

FIG. 1 and FIG. 2 of the accompanying drawings respectively show examples of flow diagrams embodying the method as proposed in the present invention, while

In FIG. 1, paraffin fed into the oxygen-expelling tank (2) through the conduit (1) is subjected to blowing of sulfur dioxide gas fed through the conduit (3), whereby the oxygen contained in paraffin is expelled and, at the same time, sulfur dioxide gas is made to dissolve in said paraffin. Subsequently, the thus processed paraffin is shifted to the light irradiation zone (5) through the conduit (4). Said light irradiation zone (5) is equipped with an ultraviolet ray irradiation lamp, and sulfur dioxide gas contained in the paraffin is excited by irradiation of ultraviolet rays. Paraffin containing sulfur dioxide gas thus excited is then supplied to the reaction tank (7) immediately from the irradiation zone (5) through the conduit (6). The reaction tank (7) is so devised that oxygen and sulfur dioxide gas are blown therein through the conduit (8) to thereby cause the sulfoxidation reaction. Further, in order to control the formation of disulfonates and the like during said sulfoxidizing reaction and/or for the purpose of effecting separation of reaction products, water is introduced into the reaction tank (7) through the conduit (9). The resultant reacted mixture containing sulfoxides is removed from the reaction tank and sent to the separation tank (11) through the conduit (10). At the stage of said separation tank, the heavy-layer containing sulfoxides and located in the lower layer is taken out through the conduit (12), while the unreacted paraffin and the like located in the upper layer is forwarded to the oxygen-expelling tank (2) through the conduit (13). Oxygen expelled from the paraffin at in the oxygen-expelling tank and containing sulfur dioxide gas is removed from said expelling tank through the conduit (14) and made to join the gas flowing through the conduit (8). And, the sulfur dioxide gas, if any, in the reaction tank 7 is discharged through the conduit (15).

FIG. 2 shows the process of embodying the method according to the present invention by employing a pair of oxygen-expelling tanks. To be precise, paraffin fed in through the conduit (21) is subjected to oxygen-expelling operation first in the expelling tank (22) and next at the expelling tank (22') by means of gas sent in through the conduit (23') and conduit (23), respectively. On this occasion, gas flowing through the conduit (23') contains oxygen expelled at the stage of the expelling tank (22'). Paraffin which has undergone said oxygen- 1,200 g./hr. When the reaction was suspended 10 hours after the commencement thereof and the quartz jacket was examined, there was observed a brown film formed on the surface of said jacket in the latter method.

EXAMPLE 4

Figure 3:
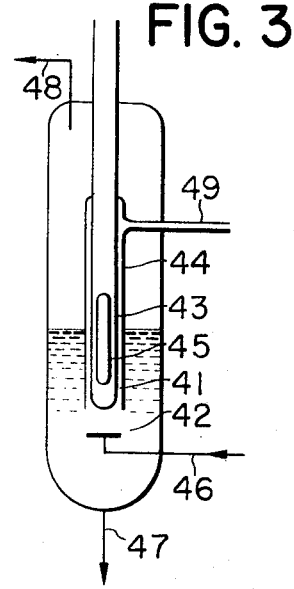
FIG. 3 shows a cross-sectional diagram of the reactor to be employed for carrying out the method according to the present invention.

By employing a reactor having the capacity of 1.5l as shown in FIG. 3 and n-paraffin of $C_{14} - C_{17}$ and carrying out the method according to the present invention, a sulfoxidizing reaction was carried out. The amount of sulfur dioxide gas and that of oxygen blown into the bottom of the reactor were fixed at 100l/hr. and 50l/hr. respectively. The resultant reacted mixture containing the reaction product was removed from the bottom of the reactor, and the unreacted paraffin recovered was made to recirculate in the reaction system. Further, the amount of water supplied to the reactor was fixed at 15ml/min. Meanwhile, for the sake of comparison, a sulfoxidizing reaction was carried out without the jacket tube (44) and under the same conditions as above while complying with the conventional method. When examined with respect to the method according the present invention and the conventional method, the yields of sulfonic acid under such conditions as resulting in the prescribed mean residence time were as shown in the following table.

| Mean retention period (hr) | Amount of sulfonic acid produced per hour (g) | |
|---|---|---|
| | Method according to the present invention | Conventional method |
| 0.9 | 57 | 44.3 |
| 2.5 | 49 | 43.6 |
| 5.5 | 46 | 28.8 |

As may be clear from the foregoing table, the method according to the present invention increases the yield of paraffin sulfonic acid under otherwise identical conditions. And, when the residence time is prolonged, the amount of decrease in said yield is remarkably small as compared with the conventional method.

EXAMPLE 5

Into a reactor having the capacity of 1.8l and the same structure as that of Example 4 was introduced 1.5l of n-paraffin of $C_{14} - C_{17}$, and, subsequently, while a mixed gas comprising $SO_2$ supplied at the rate of 50l/hr. and $O_2$ supplied at the rate of 25l/hr were blown thereinto, sulfoxidation was effected at 25°– 35° C. by means of inner irradiation with a high-pressure mercury lamp. In this case, the reaction mixture was removed successively from the bottom of the reactor at the rate of 2.05l/hr., while a portion thereof was sent to the separator for the purpose of separating the reacted substance, and the recovered paraffin was introduced into the irradiation zone. The other portion divided at the outlet of the reactor is combined with the foregoing recovered paraffin at the inlet of the irradiation zone and returned to the reactor via the irradiation zone. The amount of paraffin consumed for effecting the reaction was replenished at the inlet of the irradiation zone. For the purpose of separating the reaction substance from the reacted mixture, 15 – 25 g. of water is added to said mixture at the inlet of the separator.

The result of the present method was as follows.

| Distribution ratio of reaction mixture removed | | Sulfonic acid at the inlet of irradiation zone (%) | Yield of sulfonic acid (g/hr) |
|---|---|---|---|
| Separation tank | Direct irradiation zone | | |
| 0.25l/hr | 1.8l/hr | 13 | 18 |
| 1.05l/hr | 1l/hr | 5 | 40 |
| 1.8l/hr | 0.25l/hr | 0.4 | 47 |

EXAMPLE 6

While employing the same apparatus as that of Example 5, a reaction gas saturation tank was installed this side of the irradiation zone of said apparatus to see that the whole reacted mixture removed from the reactor and sent to the separator and the recovered paraffin obtained thereby were sent to said reaction gas saturation tank, whereby the was effected sulfoxidation. Saturation of the reaction gas was effected by blowing into the tank a mixed gas comprising $SO_2$ supplied at the rate of 100l/hr. and $O_2$ supplied at the rate 50l/hr. The mixed gas used for saturation was sent to the reaction rank in that condition and was utilized for reaction. When the removal of the reaction mixture was operated at the rate of 1.8l/hr., the result brought about was as shown in the following. When necessary for effecting separation of the reacted substance, the mixed gas was added through the reaction gas saturation tank.

| | Yield of sulfonic acid (g/hr) |
|---|---|
| In case the reaction gas saturation was applied | 54 |
| In case the reaction gas saturation was not applied | 58 |

EXAMPLE 7

In the case, n-paraffin of $C_{13} - C_{17}$ was placed in a cylindrical reactor having a capacity of 70l and equipped therein with a high-pressure mercury lamp and a quartz jacket having a closed end and installed coaxially with the cylindrical body of the reactor, and a mixed gas having the volume ratio of $SO_2 : O_2 = 75 : 25$ was blown in from the bottom of the reactor. The reaction mixture was successively removed from the bottom of the reactor, mixed with an appropriate amount of water and sent to the separator. The recovered paraffin which was obtained through separation of the heavy-layer containing reacted substances and comprising more than 97 percent-paraffin was made to pass through the opening between the quartz jacket and the outer jacket at a high velocity, and was returned into the reactor after irradiation.

Under the condition of the temperature of the reactor being 25°– 35° C., a heavy-layer containing sulfonic acid yield of 930 – 1,100 g./hr. was steadily obtained from the bottom of the separation tank.

When the same apparatus and the same conditions as above, except the absence of the outer jacket, were applied, the yield of sulfonic acid was 700 – 850 g./hr.

What is claimed is:

1. A process for the sulfoxidation of paraffinic hydro-carbon, which comprises the steps of:

feeding into an irradiation zone a feed consisting essentially of (1) liquid paraffin hydrocarbon selected from the group consisting of straight chain and branched chain paraffins having between about eight and about 20 carbon atoms, (2) $SO_2$ gas, or $SO_2$ gas and $O_2$ gas, and (3) less than about 5 weight percent of sulfoxidation reaction product, irradiating the feed in said irradiation zone with actinic radiation having a wave length in the range of $1 \times 10^{-3}$ to $4 \times 10^3$ A. thereby to generate photochemically energized $SO_2$ radicals, then flowing the irradiated feed from the irradiation zone into a reaction zone and also flowing into said reaction zone $O_2$ gas, or a mixture of $O_2$ gas and $SO_2$ gas, to effect a sulfoxidation reaction in said reaction zone at a temperature in the range of about from 15° to about 35° C., at a pressure in the range of from about 1 to about 6 atmospheres and in the absence of actinic radiation, the flow of said feed through said irradiation zone and said reaction zone being unidirectional and there being no backflow of the contents of the reaction zone into the irradiation zone, and then removing the sulfoxidation reaction product from the reaction mixture.

2. A process according to claim 1, in which the feed is continuously flowed into and through said irradiation zone and thence into said reaction zone in unidirectional flow.

3. A process according to claim 1, in which the feed to said irradiation zone is substantially free of $O_2$ so that said feed consists essentially of said paraffin and said $SO_2$ gas.

4. A process according to claim 1, including the step of expelling operation is sent to the ultraviolet ray irradiation zone (25) through the conduit (24) and subsequently sent to the reactor (27) through the conduit (26). Into said reaction tank, oxygen is blown through the conduit (28). The reaction mixture obtained at the stage of the reactor 27 is fed to the separation tank (31) through the conduit (30) and then the heavy-layer containing sulfonated products is taken out through the conduit (32). Meanwhile, the recovered unreacted paraffin is returned to the oxygen-expelling tank (22) through the conduit (33). Oxygen expelled at the expelling tank (22) and containing sulfurous acid gas is removed through the conduit (34), is joined to oxygen flowing through the conduit (28) and then is blown into the reactor (27). Further, the sulfur dioxide leaving the the reaction tank is taken into the gas holder (36) through the conduit (35) and a portion thereof is made to join the gas being blown into the reaction tank, through the conduit (37).

FIG. 3 a the reactor devised to separate the light irradiation zone from the reaction zone by means of a jacket tube equipped within the reactor. To be precise, in case of the reaction tank as herein shown, both the light irradiation zone (41) and the reaction zone (42) are provided within the reaction tank, and said two zones are separated from each other by means of the jacket tube (44) equipped outside the lamp jacket (43). Paraffin containing sulfur dioxide gas is sent to the light irradiation zone (41) through the conduit (49). On this occasion, existence of oxygen within said zone can be prevented by means carrying out an oxygen-expelling treatment of the paraffin in advance. Paraffin come flowing within the light irradiation zone (41) is subjected to ultraviolet ray irradiation from the mercury lamp (45) as it flows down within said zone, and thereby forms radicals and moves successively to the next zone (42). At the stage of the reaction zone, sulfur dioxide gas and oxygen are blown therein through the conduit (46), and the materials flowing into said reaction zone are caused to effect chain reactions, forming the intended sulfoxides. The reacted mixture containing the intended product is removed through the conduit (47) and is forwarded to the stage of separating the unreacted paraffin from the desired end product according to the conventional method. The numeral reference (48) shows the gas outlet.

In the present reaction tank, the light irradiation zone and the reaction zone are provided contiguously, but, inasmuch as paraffin moves continuously from the light irradiation zone to the reaction zone, there is no fear of the reaction products retrogressing to the light irradiation zone and, accordingly, the light energy is never consumed by the reaction products.

DESCRIPTION OF THE PREFERRED EMBODIMENTS

Example 1

Figure 1:
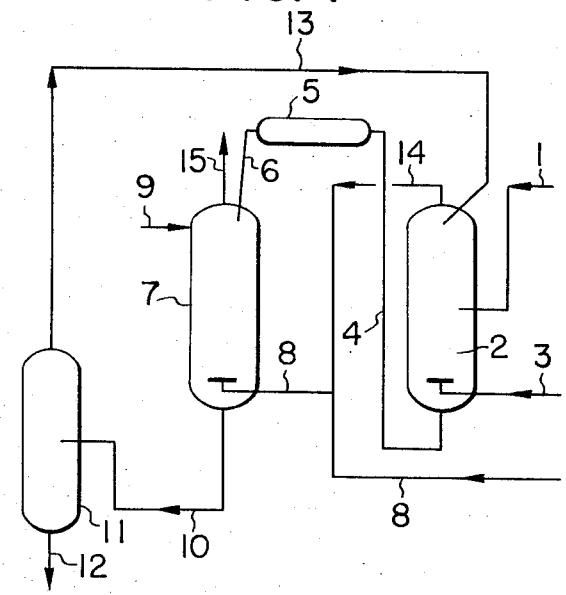

By employing a reaction apparatus having a flow as shown in FIG. 1 of the accompanying drawing, n-paraffin of $C_{14} - C_{17}$ was sulfoxidized at a reaction temperature of 30° C. The ultraviolet ray irradiation was effected by employing a high-pressure mercury lamp of 100° W and making paraffin sent from the oxygen expelling tank (2) pass through a Pyrex glass tube having the bore of 4 mm. THe amount of sulfur dioxide gas supplied to the oxygen-expelling tank and the amount of oxygen supplied to the reactor (8) were 100$l$/hr, and 50$l$/hr., respectively. Under the foregoing conditions, the reacted mixture was removed at the rate of 18$l$/hr., whereby there was obtained about 25 g./hr. of heavy-layer containing 5 g. of sulfonic acid. On the other hand, when sulfoxidation was effected without expelling oxygen in advance as in the prior art, the yield of sulfonic acid was only about 1.5 g./hr.

Example 2

Figure 2:
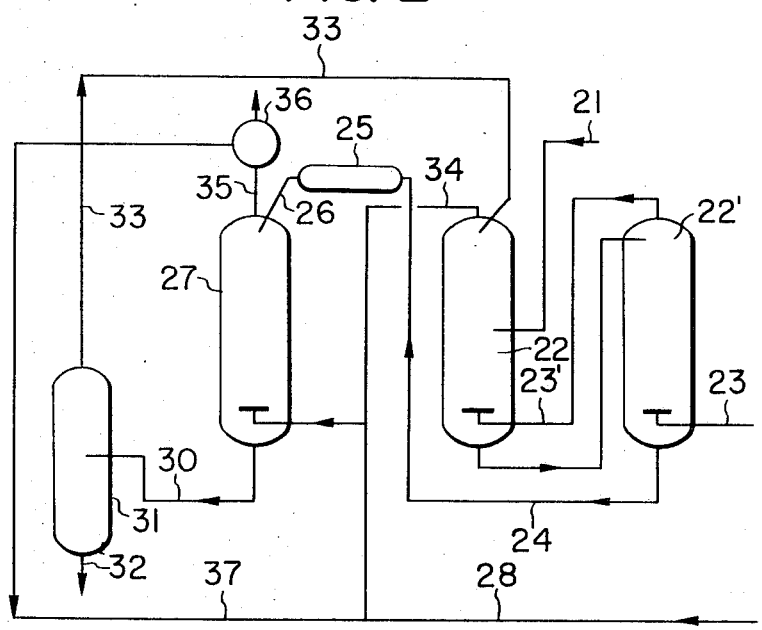

By employing a reaction apparatus having a flow as shown in FIG. 2 of the accompanying drawing, n-paraffin of $C_{14}$ was sulfoxidized under the conditions that the irradiation zone temperature was 15° C., the reaction temperature was 30° C. and the velocity of removing the reacted mixture was 4$l$/hr. The ultraviolet ray irradiation was effected by employing a low-pressure mercury lamp of 100 W. and making paraffin sent from the oxygen-expelling tank (22') pass through a silica glass tube having a bore of 4 mm. On this occasion, water was added at a velocity of 15 g./hr. to the paraffin prior to its passage through the silica glass tube. The capacities of the oxygen-expelling tanks (22) and (22') were 1.0$l$ and 0.5$l$ respectively, and the capacity of the reaction tank (27) was 1.5$l$. The flow of oxygen passing through the conduit (28) and that of sulfur dioxide gas passing through the conduit (23) were fixed to be 10$l$/hr. and 25$l$/hr. respectively, while the flow of the circulating gas in the conduit (37) was fixed to be 115$l$/hr. In the present example, a heavy-layer having the following composition was obtained from the conduit (32) at the rate of about 32 g./hr.

| paraffin sulfonic acid | 25% |
|---|---|
| sulfuric acid | 9% |
| water | 28% |
| paraffin | 38% |

Further, when oxygen-expelling was effected under the same conditions as above and by employing expelling tanks having the capacity of 1$l$ each, there was obtained a heavy-layer having the same composition as the foregoing at the rate of about 25g./hr.

EXAMPLE 3

In this case, into 25$l$, in terms of the retained amount, of n-paraffin of $C_{13} - C_{18}$ (mean molecular weight: 215) was blown a mixed gas having a volume ratio as $SO_2 : O_2 = 70 : 30$ at a velocity of 1,000$l$/hr., and the reaction temperature was maintained at 25° – 35° C. Said blowing of gas was effected by employing a cylindrical reactor having the capacity of 30$l$ and equipped with a high-pressure mercury lamp of 100 W. therein and further provided with a quartz jacket having a closed end and installed coaxially with the cylindrical body of the reactor. When steady state conditions were reached, the unreacted gas was utilized by recirculation. The reacted mixture produced by irradiation was removed from the bottom of the reactor at the rate of 125$l$/hr., was mixed with water at the rate of 350–550 g./hr. and was then forwarded to the separation tank. The reaction product was separated mainly within the heavy-layer. The layer of recovered paraffin containing paraffin of more than 99 percent-purity obtained by said separation was sent, through the cooling pipe, to the oxygen-expelling tank wherein most of the oxygen gas contained in the paraffin was removed by the fresh $SO_2$ gas blown into the tank at the rate of 35 – 100$l$/hr. and was saturated with sulfurous acid. Paraffin saturated with $SO_2$, which was removed successively from the oxygen-expelling tank, was caused to flow down while closely contacting with the surface of the quartz jacket of the lamp, to thereby return to the reaction tank. The portion of paraffin consumed for effecting the reaction was replenished at the outlet of the oxygen-expelling tank. Sulfur dioxide gas containing some oxygen employed for expelling oxygen was mixed with fresh oxygen and circulating gas and was sent to the reactor. According to this method, separation of a heavy-substance is effected by means of irradiation with a high-pressure mercury lamp of 100 W. at the rate of about 1,400 – 1,500 g./hr. The composition of said heavy-substance was as follows;

| sulfonic acid | 22% |
|---|---|
| sulfuric acid | 7% |
| water | 35% |
| paraffin | 36% |

In case paraffin, whose oxygen was expelled in the same way as above, was made to flow down near the inner wall of the reactor away from the mercury lamp, a heavy-layer containing sulfonic acid of about 21 percent was obtained at the rate of removing O₂ from said paraffin prior to feeding same into said irradiation zone.

5. A process according to claim 4, in which O₂ is removed from said paraffin by blowing SO₂ gas through said paraffin prior to feeding same into said irradiation zone.

6. A process according to claim 1, including the step of adding water to said irradiation zone.

7. A process according to claim 1, in which SO₂ gas is fed into said reaction zone simultaneously with the feeding of O₂ gas, the volume ratio of SO₂/O₂ fed into said reaction zone being in the range of 0.5 – 6.0/1

8. A process according to claim 1, in which, prior to feeding the paraffin into said irradiation zone, the paraffin is fed into a container and SO₂ gas is blown therethrough, a gaseous mixture of O₂ and SO₂ is removed from the container and is fed into the reaction zone and the paraffin containing SO₂ gas dissolved therein is removed from the container and is flowed into said irradiation zone.

9. A process according to claim 1 in which said irradiation zone is a first container having an actinic radiation source and the reaction zone is a separate second container free of actinic radiation source and connected in series with the first container so that the feed flows in series from the first container to the second.

10. A process according to claim 1, in which said irradiation zone and said reaction zone are both present within said single container and a jacket separates the two zones from each other, the feed flowing unidirectionally inside said jacket through said irradiation zone and thence flowing into said reaction zone outside of said jacket.

11. A process according to claim 1, in which the feed is paraffin saturated with SO₂ gas and in which the gas flowed into the reaction zone consists of O₂ gas.

* * * * *